UNITED STATES PATENT OFFICE 2,050,491

METHOD OF PREPARING SODIUM GLUTAMATE

George S. Kumagai, Los Angeles, Calif.

No Drawing. Application July 17, 1934, Serial No. 735,625

5 Claims. (Cl. 260—119)

This invention relates to a new and highly efficient method of preparing sodium glutamate from ingredients including animal or vegetable protein-containing substances.

An object of the invention is to provide a method such as above described, which is productive of a comparatively great yield of sodium glutamate in an exceptionally efficacious manner and at a low cost.

Corn gluten meal, beans, bean cakes, and other cereals and cereal products contain in addition to proteins large quantities of carbohydrates which latter produce quantities of melanin tending to decrease the yield of glutamic acid, when the cereal is hydrolyzed with concentrated mineral acid for the purpose of preparing glutamic acid. Furthermore, under this treatment the hydrolyzate becomes too viscous to permit of the desired crystallization of glutamic acid hydrochloride from the mother liquor.

With the method of this invention, the loss of valuable proteins and glutamic acid due to the production of melanin and the high viscosity of the hydrolyzate, is curtailed and a greater yield of such acid and sodium glutamate which is prepared therefrom is assured.

The method of the present invention contemplates immersing the cereal to be treated in saturated chlorine water or dilute mineral acid which in either case contains a protein coagulating agent such as an aluminium, magnesium, tin, or zinc salt. The immersed cereal is steam treated in a digester to convert a major portion of the carbohydrate into a soluble state to render insoluble a large portion of the proteins. Next the mixture is filtered to collect the protein laden residual matter which latter is boiled with concentrated mineral acid until hydrolyzed to amino acids. The solution is again filtered from the residual matter or melanin and evaporated to a comparatively small bulk. When in the latter condition crystallization of the glutamic acid hydrochloride readily takes place on proper cooling of the liquid. Sodium glutamate may now be obtained in comparatively high yield by neutralizing the hydrochloride and evaporating the solution, as will be herein after more fully explained.

Excellent results have been obtained by carrying out the method of this invention as will now be explained.

Place in a suitable digester 100 kgs. of corn gluten meal (or other cereal or cereal product) together with 100 litres of saturated chlorine water having a 1 kg. content of magnesium chloride. Instead of the chlorine water I may use a 0.1 to 0.5% mineral acid solution having a 1 kg. content of magnesium chloride or the like. In either case the mixture is steamed in the digester for from 3 to 5 hours under from 10 to 20 pounds steam pressure. After which upon cooling the solution is filtered off. This steam treated matter is now mixed with 50 kgs. of concentrated hydrochloric acid and boiled for from 15 to 20 hours or may be placed in a digester with 25 kgs. of concentrated hydrochloric acid and 25 litres of water and steamed for from 10 to 15 hours at a pressure of from 20 to 30 pounds.

In either case the liquid thus treated is next filtered and the black residue of melanin is washed with 200 litres of hot water. Following this the combined filtrate and washings are concentrated in any suitable manner to reduce the volume of solution to approximately 40 litres. This concentrated matter is allowed to cool, say to room temperature and the glutamic acid hydrochloride will then crystallize out. The crystals are then filtered from the mother liquor as glutamic acid hydrochloride. These crystals are next dissolved in 65 liters of water in the presence of a 2N caustic soda solution which latter is added until the acidity of the solution reaches pH 3. Upon now being allowed to stand say from 8 to 12 hours, the free glutamic acid which has crystallized, is centrifuged.

This free glutamic acid is suspended in 100 litres of water and is brought into solution as sodium glutamate by neutralizing with 6 kgs. of sodium bicarbonate. Solid sodium glutamate is obtained by evaporation of this solution after boiling the latter with a suitable decolorizing charcoal. The yield of such solid sodium glutamate, from ingredients in the proportions and treated as hereinbefore noted is from 5.5 to 6 kilograms.

While the foregoing deals primarily with a method of treating vegetable matter, it is to be understood that the method of this invention may be carried out in the treatment of animal matter containing proteins for the preparation of sodium glutamate therefrom.

I claim:

1. The method of preparing sodium glutamate which consists in digesting with a dilute mineral acid, a material which contains besides proteins a large quantity of carbohydrates, in the presence of a protein coagulating agent, filtering the mixtures thus treated, hydrolyzing the filtered out material with a concentrated hydrochloric acid, concentrating the mixture, then cooling same to effect crystallization of glutamic acid hydrochloride, then neutralizing the mixture with sodium bicarbonate to produce sodium glutamate.

2. The method of preparing sodium glutamate which consists in digesting with a saturated chlorine water, a material which contains besides proteins a large quantity of carbohydrate, in the presence of a protein coagulating agent, filtering the mixtures thus treated, hydrolyzing the filtered out material with a concentrated hydrochloric acid, concentrating the mixture, then cooling same to effect crystallization of glutamic acid hydrochloride, then neutralizing the mixture with sodium bicarbonate to produce sodium glutamate, then evaporating the matter thus treated to obtain solid sodium glutamate.

3. The method of preparing sodium glutamate by boiling vegetable material, which contains besides proteins a large quantity of carbohydrates, with chlorine water containing a protein coagulating agent, to dissolve out carbohydrate converting it into soluble form and to render the proteins insoluble, the latter being hydrolyzed with hydrochloric acid, neutralized in reaction and evaporated.

4. The method of preparing sodium glutamate which consists in digesting a material which contains besides proteins a large quantity of carbohydrates with the aid of a mineral acid solution containing a protein coagulating agent, then mixing the insoluble portion of the digested matter with a concentrated hydrochloric acid and boiling such mixture, then washing the mixture thus treated and concentrating the mixture and washings, allowing the concentrated mixture to cool whereby glutamic acid hydrochloride will crystallize, then dissolving the crystals in a caustic soda solution, then neutralizing the thus treated matter with sodium bicarbonate to produce sodium glutamate.

5. The method of preparing sodium glutamate by boiling a vegetable substance which contains in addition to proteins a large quantity of carbohydrates in a dilute mineral acid solution which latter contains a protein coagulating agent to dissolve out carbohydrates, convert it into solubles and to render proteins insoluble, the latter being subjected to acid hydrolysis, made neutral in reaction and evaporated.

GEORGE S. KUMAGAI.